Feb. 13, 1951   N. J. POWLICK   2,541,718
PONY-CYCLE FOR CHILDREN
Filed July 28, 1948   3 Sheets-Sheet 2
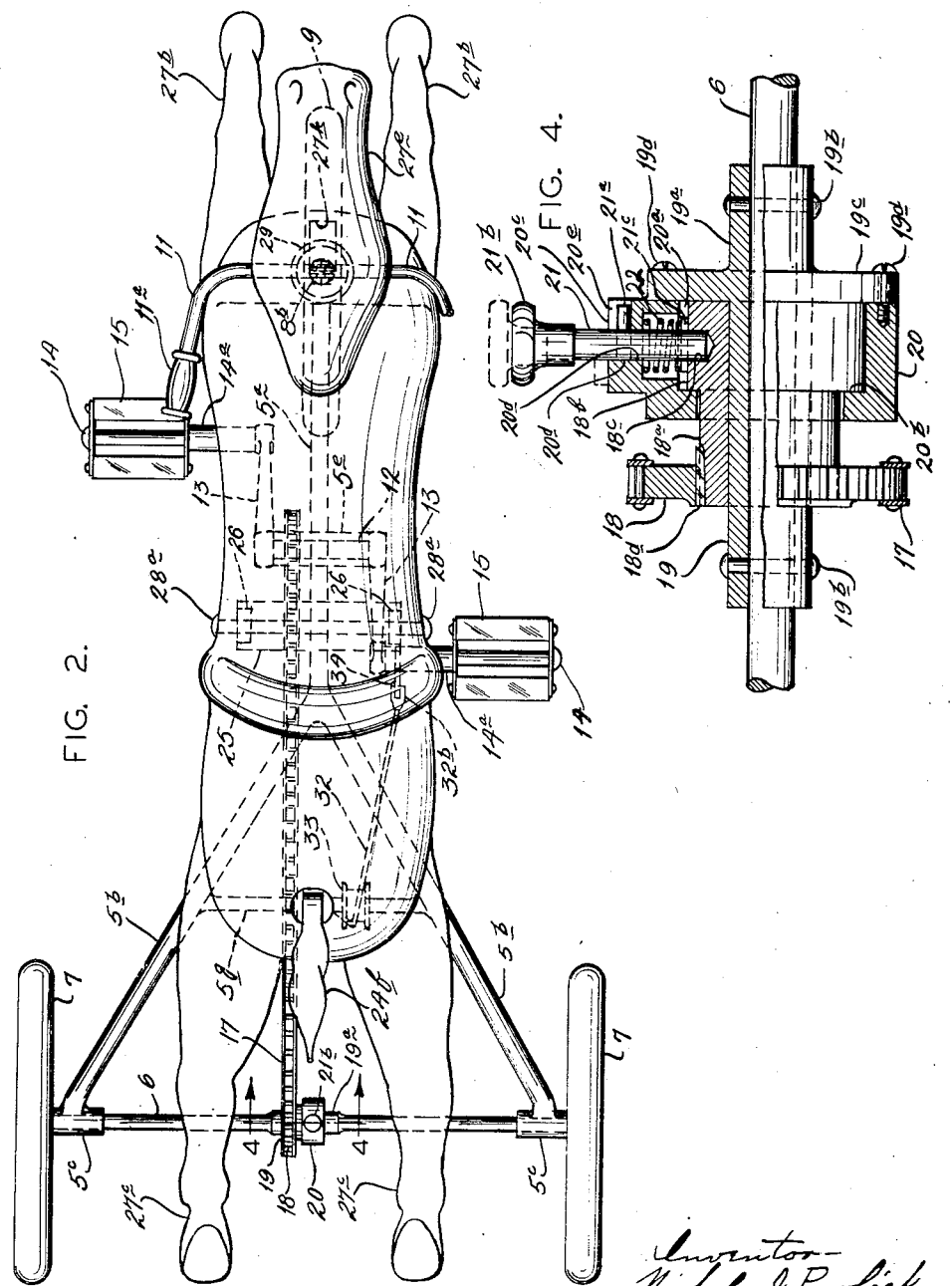

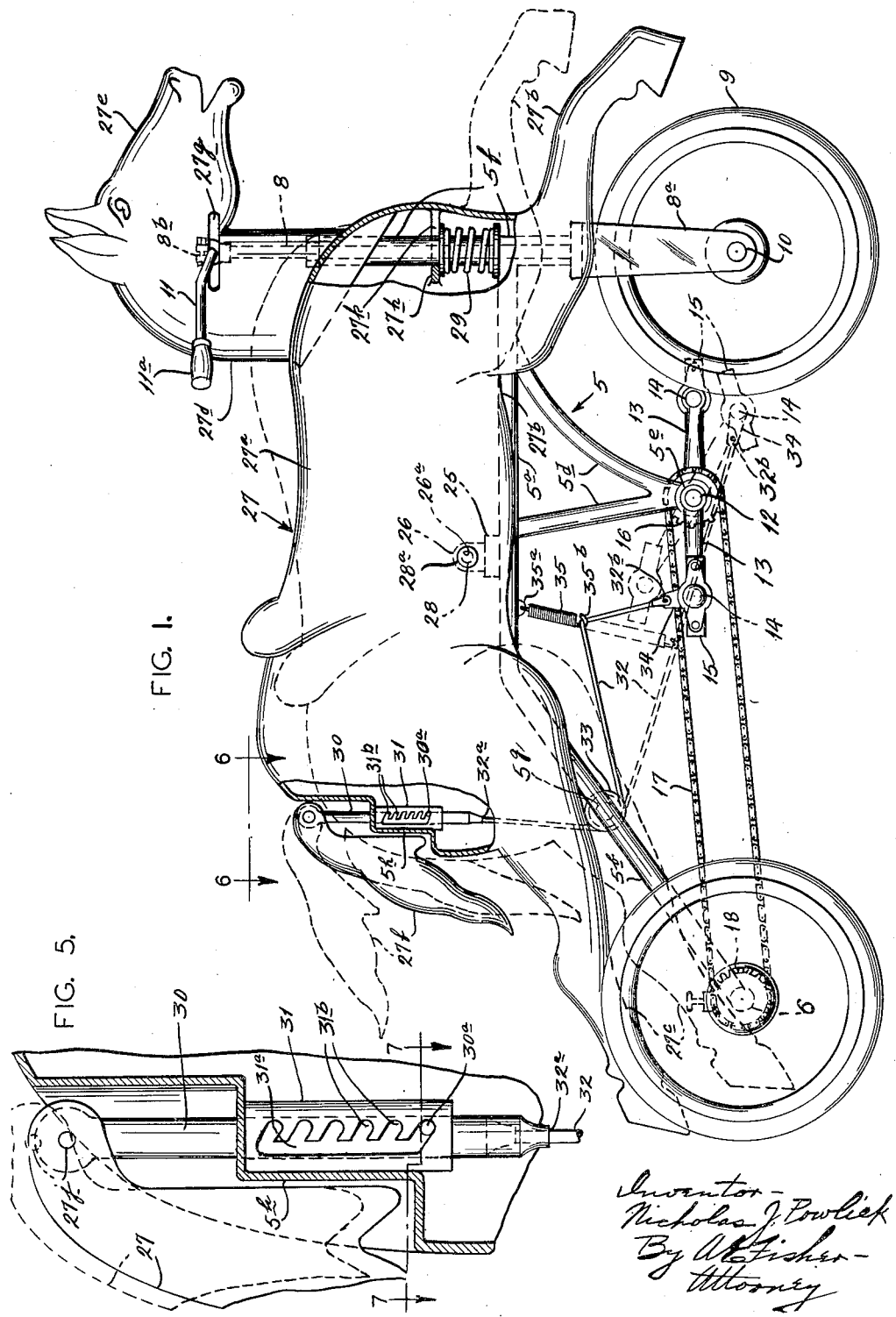

Feb. 13, 1951 N. J. POWLICK 2,541,718
PONY-CYCLE FOR CHILDREN
Filed July 28, 1948 3 Sheets-Sheet 3
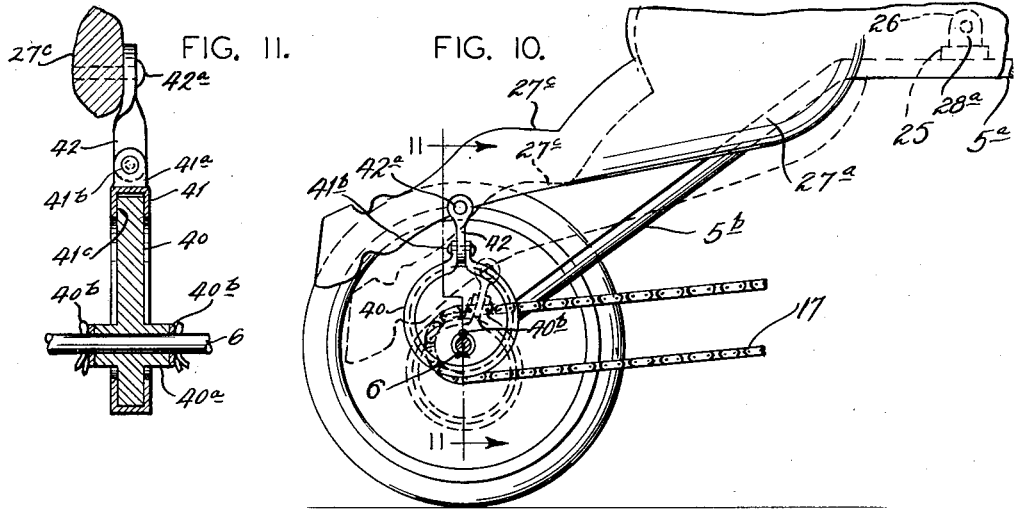
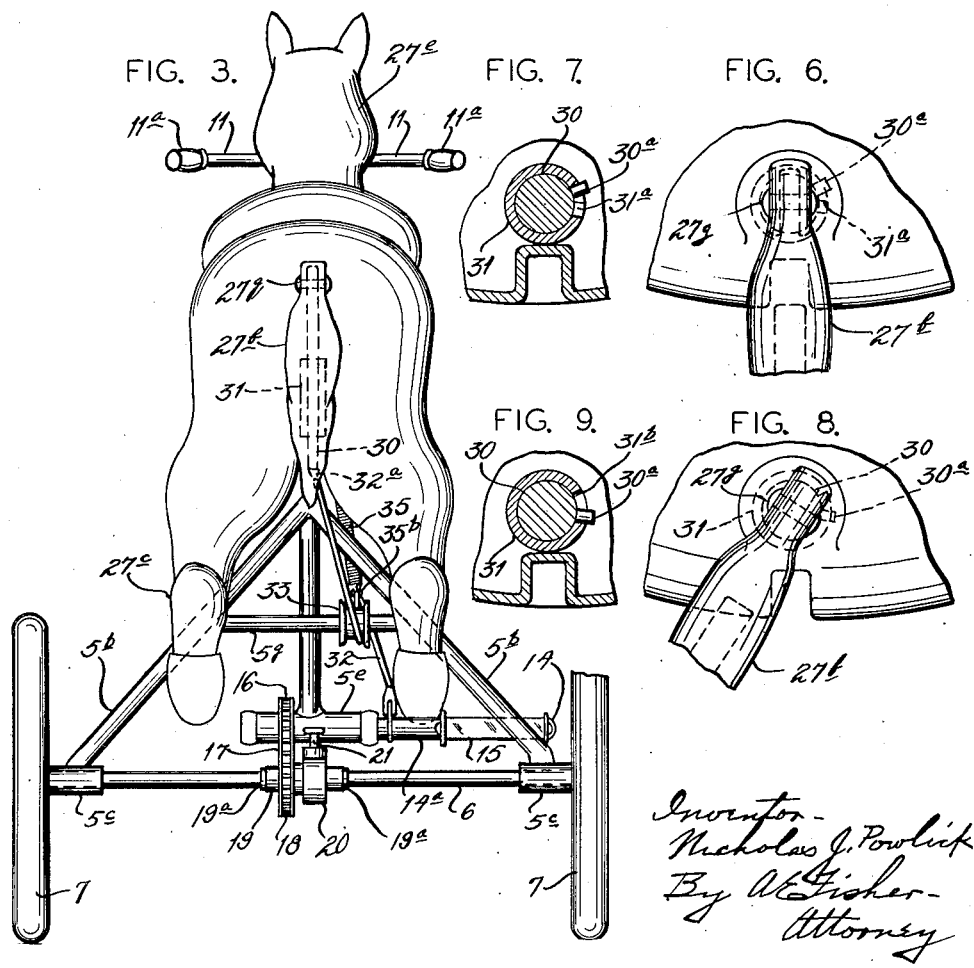
Inventor—
Nicholas J. Powlick
By A. E. Fisher
Attorney Patented Feb. 13, 1951

2,541,718

UNITED STATES PATENT OFFICE 2,541,718

PONY-CYCLE FOR CHILDREN

Nicholas J. Powlick, Chicago, Ill.

Application July 28, 1948, Serial No. 41,050

3 Claims. (Cl. 280—1.196)

This invention relates to pony-cycles for children, and is in the nature of a combined velocipede and hobby horse or pony, this invention embodying certain improvements upon the pony-cycle heretofore patented by me on July 29, 1947, under Patent Number 2,424,632.

The primary object of the present invention is to provide specific forms of attachments and accessories designed and adapted for mounting upon a conventional three-wheeled velocipede, for the purpose of converting it into a pony-cycle or hobby-horse, and including outer coverings, casings and caparisons simulating the appearance of a pony, and mechanical devices for causing the pony to simulate a galloping action, as the vehicle is propelled over the ground.

A further object of the invention is to provide a pony-cycle of the kind above referred to, with means incorporated thereon for limiting the pedalling action of the machine to a mere rocking movement of the simulated pony, the horizontal travel thereof being eliminated, and whereby the machine may be used as an exercising machine alone, in stationary position.

Another object of the invention is to provide, in combination, a velocipede chassis including a suitably elongated frame, a pair of rear wheels rigidly mounted at the ends of an axle-shaft journaled transversely at the rear end of the frame, a steerable front wheel at the lower end of a steering post journaled vertically in the forward end of the frame, crank pedals at the ends of a drive shaft journaled medially and transversely through the frame, a drive sprocket rigidly mounted on one end of the drive shaft, a complemental driven sprocket journaled freely on the rear axle shaft in longitudinal alignment with the drive sprocket, means for releasably locking the driven sprocket to the axle shaft, a sprocket chain trained over the drive and driven sprockets, a rider's support and seat rockingly mounted atop the frame and configured in simulation of a pony, the said steering post of the frontal steering wheel being extended up through the neck of the simulated pony, and the conventional handle-bars of the steering unit being extended out through slots formed horizontally through the sides of the head of the simulated pony, means actuated by the travel of the machine for causing the rider's support and seat (here shown as a simulated pony) to oscillate vertically at its ends in simulation to the galloping action of a pony, said means including means for thus oscillating the rider's support and seat independently of the travel of the machine, for the purpose of adapting it for use as a stationary exercising apparatus.

With the stated objects in view, together with such additional objects and advantages as may appear from the specification, attention is now directed to the accompanying drawing, as illustrating a certain preferred embodiment of the invention, as well as specific structural features thereof, and wherein:

Figure 1 is a side elevational view of the pony-cycle, with attachments, housings and caparisons mounted thereon in simulation of the appearance of a pony, and for imitating the movements of such pony in travel, parts being broken out for showing the interior structure. The oscillation of the pony is indicated in dotted lines.

Figure 2 is a top plan view of the pony-cycle as shown in Figure 1.

Figure 3 is a rear end view of the pony-cycle as shown in Figure 1.

Figure 4 is a sectional detail on an enlarged scale, taken on the line 4—4 of Figure 2.

Figure 5 is a detail view on an enlarged scale and in side elevation, of the rear end of the pony-cycle, showing the mechanism provided for varying the degree of vertical oscillation of the simulated pony, in travel as in galloping.

Figure 6 is a sectional detail on an enlarged scale, taken on the line 6—6 of Figure 1.

Figure 7 is a cross-sectional detail taken on the line 7—7 of Figure 5.

Figure 8 is a view similar to that of Figure 6, showing the method of varying the vertical oscillations of the pony in travel, through moving the tail appendages laterally for the purpose of resetting the devices controlling such oscillations.

Figure 9 relates to Figure 7 and shows an alternate positioning of the elements involved in the operation of resetting the oscillatory devices.

Figure 10 is a detail view in side elevation of the rear section of the pony-cycle, showing alternate means for oscillating the pony-cycle.

Figure 11 is a cross section on the line 11—11 of Figure 10.

The present invention embraces certain mechanical devices, attachments and housings for mounting upon a conventional three-wheeled velocipede for converting same into a pony-cycle of the kind referred to. Such velocipede ordinarily includes an elongated frame represented generally at 5, the same comprising the rider or saddle bar 5a, the downwardly inclined and divergent axle-shaft bars 5b with attached bearing sleeves 5c, the medial pedal hangers 5d carrying the transversely extended pedal sleeve 5e at the lower connected ends thereof, and the frontal steering post head 5f. A cross-bar 5g connects with and braces the axle-shaft bars 5b. An axle shaft 6 is journaled through the sleeves 5c and wheels 7 are mounted upon the extended outer ends of the shaft 6, one of the wheels at least being rigidly anchored to the shaft, so as to rotate the shaft with the wheel. A steering post 8 is journaled down through the head 5f, the same carrying at its lower end the wheel fork 8a, within which is mounted the frontal steering wheel 9 on the stub shaft 10. Handle bars 11 are mounted transversely at the upper end of the post 8. A crank or drive shaft 12 is journaled through the pedal sleeve 5e, crank arms 13 are rigidly keyed upon the extended ends of the shaft 12 and turned perpendicularly in opposite directions, pedal pins 14 are rigidly seated in the ends of the arms 13, and foot pedals 15 are journaled upon these pins. A drive sprocket 16 is keyed upon the crank shaft 12 and a sprocket chain 17 is trained over this sprocket and over the aligned driven sprocket 18 mounted upon the rear axle shaft 6. All of the foregoing is conventional structure.

In accordance with the present invention, and as shown assembled in Figure 4, hub parts 19, 19a are slidably mounted upon the rotatable axle shaft 6 of the vehicle in longitudinal alignment with the drive sprocket 16, these hub parts being rigidly anchored to the shaft, and so as to rotate therewith, by rivets 19b passed through the parts and the shaft after the other elements to be described are all properly assembled. The hub-part 19a is formed with an inwardly positioned circular flange 19c. The driven sprocket 18 is keyed as at 18d upon an inwardly extended hub 18a which in assembling is rotatably journaled upon the hub part 19 with the inner end of the hub freely abutting the flange 18c of the hub-part 19a. The inner end of the hub 18a is formed with a raised boss 18b which is formed with a clutch-pin-socket 18c sunk centrally into its circumferential side or periphery for a purpose later explained. A broad clutch-ring 20 is provided, the same being fully open at one side as at 20a, and open also at the opposite side but formed thereat with an inturned annular flange 20b which abuts freely against the outer shoulder of the boss 18b of the hub 18a. Set screws 19d are passed through the flange 19c of the fixed hub part 19a and are seated in the clutch ring 20, as means for locking this ring to the flange of the hub-part 19a. Thus these elements are operatively connected with the driven sprocket 18 and the sprocket hub 18a as rotatably journaled upon the hub-part 19, is stopped against lateral movement by reason of the flange 20b of the clutch-ring 20 freely contacting the outer shoulder of the boss 18b.

A hollow nipple 20c is seated upon the clutch-ring 20 and opens inwardly towards the boss 18b and socket 18c. The outer end of this nipple is bored through as at 20d for slidably passing a suitably heavy clutch-pin 21, into the outer end of which is seated a small latch-pin 21a, spaced inwardly from the head 21b. A cotter pin 21c is passed through the clutch-pin 21 in suitably spaced relation to the inner extremity thereof. The latch pin 21a is adapted to engage a latch-notch 20e formed radially in the outer end of the nipple 20c, as the clutch-pin 21 and latch-pin 21a are rotated for the purpose of such engagement and as later explained. An expansion coil spring 22 is seated over the inner end of the clutch pin 21 and within the nipple 20c, the said spring being braced at its ends between the cotter pin 21c and the inner side of the outer end of the nipple 20c. By these devices and arrangements the normal action of the spring 22 is to urge the clutch pin 21 inwardly. With the clutch pin 21 pulled outwardly and rotated to turn the latch pin 21a away from the latch notch 20e, to rest upon the outer face of the end of the nipple 20c, then the inner end of the clutch pin 21 will be withdrawn from the socket 18c of the hub boss 18b, and the sprocket hub 18a and connected driven sprocket 18 may rotate freely upon the hub-part 19 and without turning the axle-shaft 6; but by rotating the axle shaft 6 to align the socket 18c of the hub boss 18b with the inner end of the clutch pin 21, and rotating the clutch-pin 21 to align the latch pin 21a with the latch notch 20e, the spring 22 will force the latch pin into the latch notch, and the sprocket hub 18a and driven sprocket 18 will then rotate with the axle shaft 6, and of course the wheels 7 as mounted at the ends of this shaft, thus causing the vehicle to travel.

A wide and flat teeter slat or bar 25 of suitable length is rigidly anchored by welding or otherwise, transversely and horizontally upon the saddle bar 5a of the frame 5, and pivot blocks 26 are rigidly anchored upon the ends of this teeter bar, the said blocks being bored through as at 26a in exact transverse alignment. Since an important object of the invention is the simulation in appearance and action of a pony in motion, suitably elongated, hollow and pony-simulative casings or housings 27 are provided, the same being formed of any suitable material, such as sheet metal or plastics, and including a body or saddle portion 27a, frontal leg portions 27b, rear leg portions 27c, a neck portion 27d, a head portion 27e, and a tail portion 27f. The various portions of the casings are substantially hollow as stated for the sake of lightness, and the body portion 27a is open from end to end along its under side, as indicated at 27b. These casings, with the exception of the tail portion, are all separately and operatively mounted together, in manner later pointed out and are dimensioned, shaped and formed to nicely seat and fit over the frame 5 in furtherance of the purpose of the invention in the respect of simulating a pony. For the purpose of oscillatably mounting the described casings upon the frame 5, a pivot rod 28 is passed through the pivot blocks 26 of the bar 25, and the ends of this rod are then passed medially through the margins of the opening 27b at the under side of the body portion, and there firmly anchored by welding or otherwise, as indicated at 28a in Figure 2.

In thus assembling the pony-like casings upon the frame 5, the steering post 8 is inserted up through the hollow neck 27d, at the forward side thereof, the upper end of this post reaching to the base of the head 27e, the head being slotted horizontally at this point, as shown at 27g in Figure 1, for operatively passing the handle bars 11 into the head 8b of the steering post 8 and anchoring them there. In this process one or both of the handles 11a are removed and later replaced. A bracket 27h is rigidly and horizontally extended inwardly from the lower portion of the forward end of the body portion 27a, this bracket being apertured as at 27k for passing the upper end of the steering post 5f, and in the process of assembly a suitably heavy coiled shock absorbing spring 29 is seated over the upper end of the steering post head 5f before this upper end of the head is inserted up through the apertured bracket 27h and into the head 27e. Thus the spring 29 is braced between the upper bracket and the forward end of the rider or saddle bar 5a at its point of connection with the steering post head 5f. Thus the spring 29 provides a resilient bearing for the pony-like casings as described, and serves as a shock absorber for the vehicle in operation and use. The teeter slat 25 and pivot rod 28 are so located across the frame 5, that normally the forward end of the frame and casings will out-weigh the rear end thereof, and thus cause the frontal end to constantly bear upon the spring 29.

The devices for imparting vertical oscillatory, rocking or simulative galloping movement to the pony-cycle as described, and for increasing or decreasing the degree of such action, comprise a tail supporting rod 30 which is slidably journaled down through a tubular housing 31 welded or otherwise mounted within the stepped or offset portion 27a of the rear end of the casing 27a (Figures 1 and 5). The housing 31 is positioned vertically as shown and is formed laterally with an elongated slot 31a having a series of spaced adjustment or latch notches 31b extended angularly into its inner margin. The tail portion 27f of the imitative pony casings is pivotally pinned as at 27g to the upper end of the rod 30, and a latch stud 30a is seated laterally in the rod 30, within the housing 31, this stud being adapted to selectively and releasably seat in either of the latch notches 31b. Thus the rider of the vehicle, by taking hold of the tail 27f and turning it to the left as shown in Figure 8, may release the latch stud 30a from the latch notch 31b in which notch it may be riding, and then by raising or lowering the tail rod 30, with the stud 30a traversing the elongate slot 31a, he may relocate the stud 30a selectively in a higher or lower notch 31b, as he may desire, the tail then falling back to its normal position, as shown in Figure 6. The relative positions of the elements referred to in the described operations are illustrated in Figures 6 to 9.

As shown in Figures 1 and 3, a flexible pull-cable 32 is secured at its outer end to the lower end of the tail rod 30, as indicated at 32a, and is passed down rearwardly under a flanged idler pulley 33, the opposite end of this cable being extended forwardly and fastened as at 32b to the rearwardly turned end of a short and flat pull-shackle or link 34, the forward end of this link being bored through transversely and thereby freely seated upon the right hand pedal pin 14, between the associated crank arm 13 and a sleeve 14a mounted upon the pedal pin inwardly of the pedal 15. The length of the cable 32 is such that with the tail rod 30 lowered and latched to its lowest position, and with the crank arm 13 and pedal 15 turned and extended straightly forward, the said cable will be drawn out substantially free of slack, but not taut enough to interfere with the free rotation of the crank or drive shaft 12, or to exert any pull upon the tail rod 30. However, on the reverse rearward movement of this crank arm and pedal, it is obvious that there will be a certain amount of slack or looseness in the cable 32. In order to take care of this slack, a retractive coil spring 35 is fastened at its upper end, as at 35a, to a tab depended from the rider bar 5a, and is hooked at its lower end, as at 35b, for engaging the cable at a medial point thereon, as shown in Figure 1. This spring thus functions to draw up the slack of the cable on each revolution of the crank shaft 12. The alternate taut and slack phases of the cable are shown, respectively, in full and broken lines in Figure 1. With these elements arranged in this manner, and with the clutch pin 21 seated at its lower end in the socket 18c, the pony-cycle may be propelled evenly along the ground, after the manner of an ordinary velocipede. To cause the pony-cycle to simulate the rocking or galloping movements of a pony, all that is necessary is for the rider to raise the tail rod 30 by taking hold of the tail 27f, turn same to the left for unlatching the stud 30a from the lower latch notch 31b, pull the rod 30 upward for aligning the stud 30a with a higher one of the latch-notches 31b, and then swing the tail back into its normal vertical position, thus rotating the rod 30 and entering the stud 30a into such higher notch. By thus latching the rod 30 into a raised position, it is obvious that as the crank shaft 12 is rotated, the cable 32 will pull downwardly upon the rod 30, causing the forward end of the simulated pony to rise to a degree equal to the elevation of the latch stud 30a in the notches 31b. If it is desired to adapt the vehicle for use as an exercising machine in stationary position, all that is necessary is to withdraw the clutch-pin 21 from the socket 18c and rotate it for seating the latch pin 21a outwardly of the latch notch 20e formed in the nipple 20c of the clutch-ring 20, which arrangement permits the pedals 15, crank arms 13, crank shaft 12 and chain 17, all to be worked and operated without travel of the vehicle.

As an alternate means for causing the described rocking or galloping action of the pony-cycle, and dispensing with the cable 17, tail rod 30 and all connected and associated elements, attention is directed to Figures 10 and 11, wherein a cam-wheel 40 on its hub 40a is shown as rigidly keyed at 40b upon the axle shaft 6, this cam-wheel having a parted band 41 slidably encircling the periphery of the cam wheel, the parted ends of this band being formed as transversely positioned and circumferentially spaced tabs 41a between which is pinned as at 41b the lower end of a push rod 42, the upper end of this rod being pivotally pinned as at 42a, upwardly upon the inner side of the left rear leg 27c of the pony simulative casings 27. The band 41 is channeled circumferentially at its inner side, as shown at 41c in Figure 11, for slidably engaging the periphery of the cam wheel 40. It is apparent that this arrangement, equally with the aforesaid pull cable and accessories, will serve to rock and oscillate the pony-cycle frame and casings as the crank shaft 12 is rotated.

From the foregoing description of the improved pony-cycle, it is thought that the construction, use and operation of the vehicle will be readily understood, and while I have here shown and described specific structural features of the invention, the same may be changed or modified as desired, within the scope of the claims.

I claim:

1. In combination with a conventional velocipede including an elongate frame, an axle-shaft journaled horizontally and transversely at the rear end of the frame, wheels rigidly mounted at the extended ends of the axle-shaft, a steering post journaled vertically at the forward end of the frame, a steering wheel mounted at the lower end of the steering post, a drive shaft journaled medially and transversely through the frame, crank arms rigidly mounted at the ends of the drive shaft, pedal pins seated in the outer ends of the crank arms, pedals journaled upon the pedal pins, a drive sprocket rigidly mounted upon the drive shaft, a complemental driven sprocket mounted upon the rear axle shaft in operative alignment with the drive sprocket, a sprocket chain trained over the drive and driven sprockets, the said driven sprocket being freely journaled upon the axle shaft, clutch means for releasably locking the driven sprocket to the axle shaft, hollow casings formed and configured in simulation of a pony and mounted upon the frame and thus arranged for alternate vertical oscillation at the ends thereof, said steering post of the frontal steering wheel being extended up through the neck of the simulated pony, and the conventional handle bars of the steering unit being extended out through slots formed and lengthened horizontally through the sides of the head of the simulated pony, a flexible cable extended freely underneath the frame and connected at one end to the rear end of the pony simulative casings and at the opposite end to one of the pedal pins, said cable being drawn taut enough to cause a downward movement of the rear end of the casings, and a consequent rocking action thereof, upon each forward movement of the connected pedal pin, as the vehicle is pedalled along the ground.

2. In a vehicle according to claim 1, means for taking up the slack of the cable upon the rearward movement of the connected pedal pin.

3. In a vehicle according to claim 2, means for adjusting and varying the tautness and effective length of the cable, for correspondingly varying the degree of rocking action of the pony simulative casings, or for eliminating such rocking action entirely.

NICHOLAS J. POWLICK.

REFERENCES CITED

The following references are of record in the file of this patent:

UNITED STATES PATENTS

| Number | Name | Date |
|---|---|---|
| 209,712 | Pratt | Nov. 5, 1878 |
| 582,957 | Schellack et al. | May 18, 1897 |
| 973,303 | Replogle | Oct. 18, 1910 |
| 1,519,493 | Harker | Dec. 16, 1924 |
| 2,177,552 | Ruble | Oct. 24, 1939 |
| 2,216,426 | Willcox | Oct. 1, 1940 |
| 2,424,632 | Powlick | July 29, 1947 |

FOREIGN PATENTS

| Number | Country | Date |
|---|---|---|
| 340,863 | Germany | Sept. 20, 1921 |